United States Patent [19]

Bando

[11] Patent Number: 5,873,773

[45] Date of Patent: Feb. 23, 1999

[54] GLASS-PLATE WORKING APPARATUS

[75] Inventor: Shigeru Bando, Tokushima, Japan

[73] Assignee: Bando Kiko Co., Ltd., Tokushima, Japan

[21] Appl. No.: 666,275

[22] PCT Filed: Jan. 19, 1996

[86] PCT No.: PCT/JP96/00089

§ 371 Date: Jun. 20, 1996

§ 102(e) Date: Jun. 20, 1996

[87] PCT Pub. No.: WO96/23738

PCT Pub. Date: Aug. 8, 1996

[30] Foreign Application Priority Data

Jan. 31, 1995 [JP] Japan .................................... 7-034224

[51] Int. Cl.⁶ .................................................... B24B 1/00

[52] U.S. Cl. ................ 451/70; 451/44; 451/69; 451/231; 451/336; 125/23.01; 225/94; 225/103

[58] Field of Search ................................... 451/41, 43, 44, 451/236, 54, 57, 67, 68, 69, 336, 70, 231; 125/23.01, 23.02; 225/96.5, 2, 94, 103

[56] References Cited

U.S. PATENT DOCUMENTS

| | | | |
|---|---|---|---|
| 3,567,547 | 3/1971 | Mattson et al. | 451/41 |
| 3,574,976 | 4/1971 | McMaster | 451/41 |
| 5,079,876 | 1/1992 | Zumstein | 451/57 |
| 5,415,581 | 5/1995 | Bando | 451/41 |

FOREIGN PATENT DOCUMENTS

| | | |
|---|---|---|
| 62-78123 | 4/1987 | Japan . |
| 3-69853 | 11/1991 | Japan . |
| 6-24779 | 2/1994 | Japan . |

*Primary Examiner*—Eileen P. Morgan
*Attorney, Agent, or Firm*—Nixon & Vanderhye

[57] ABSTRACT

A glass-plate working apparatus 1 includes: a supporting device 7 for supporting a glass plate 6 from a glass plate carrying-in section 2; a main cutter head device 9 for forming a main cut line 8 for bend-breaking on the glass plate 6 supported by the supporting device 7; a maincutter-head moving device 10 for relatively moving the main cutter head device 9; bend-breaking head devices 13 and 14 for forming edge cut lines 11 for bend-breaking on the glass plate 6 and for pressing the glass plate 6 to bend-break the glass plate 6; and bend-breaking head moving devices 15 and 16 for moving the bend-breaking head devices 13 and 14.

7 Claims, 6 Drawing Sheets

GLASS-PLATE WORKING APPARATUS

TECHNICAL FIELD

The present invention relates to a glass-plate working apparatus for manufacturing, for example, window glass for an automobile, such as a front window, a side window, and a rear window, panes for buildings, and other glass plates of predetermined configurations by bend-breaking unworked plate glass into a given configuration and by grinding a bend-broken edge of the bend-broken glass plate.

BACKGROUND ART

Conventionally, in a conventional glass-plate working apparatus of this type, a glass-plate carrying-in section and a main cut-line forming section in proximity to the glass-plate carrying-in section are disposed. In this main cut-line forming section, a given main cut line for bend-breaking is formed on unworked plate glass, and then the unworked plate glass on which the main cut line for bend-breaking has been formed is transported to a glass plate bend-breaking section which is disposed in proximity to the main cut-line forming section. In the glass plate bend-breaking section, an edge cut line is formed on the unworked plate glass on which the main cut line has been formed. Subsequently, the unworked plate glass on which the main cut line and the edge cut line have been formed is subjected to bend-breaking. The bend-broken edge of the bend-broken glass plate is ground in a glass plate peripheral-edge grinding section which is disposed in proximity to the glass-plate bend-breaking section.

With the conventional glass-plate working apparatus described above, since the main cut-line forming section and the glass plate bend-breaking section are provided, the installation space of the apparatus becomes large. In addition, a plurality of stages of transporting the unworked plate glass, including the transportation of the unworked plate glass from the glass plate carrying-in section to the main cut-line forming section and the transportation of the unworked plate glass from the main cut-line forming section to the glass plate bend-breaking section, are required. For this reason, the conventional glass-plate working apparatus has various problems ascribable to the transportation, such as a decline in productivity due to the transport time, and the problem of a positioning error between the placement of the glass plate on the main cut-line forming section and the placement of the glass plate on the glass plate bend-breaking section.

The present invention has been devised in view of the above-described aspects, and its object is to provide a glass-plate working apparatus which is capable of overcoming the above-described problems.

Another object of the present invention is to provide a glass-plate working apparatus which is capable of fabricating glass plates of given configurations with high productivity.

Still another object of the present invention is to provide a glass-plate working apparatus which is capable of forming a main cut line and an edge cut line, as desired, and of working glass plates having aimed configurations with high accuracy.

DISCLOSURE OF THE INVENTION

In accordance with the present invention, the above objects are attained by a glass-plate working apparatus comprising: a supporting device for supporting a glass plate; at least one main cutter head device for forming a main cut line for bend-breaking on the glass plate supported by the supporting device; a main-cutter-head moving device for relatively moving the main cutter head device with respect to the glass plate supported by the supporting device, in correspondence with the main cut line for bend-breaking to be formed; at least one bend-breaking head device for forming an edge cut line for bend-breaking on the glass plate supported by the supporting device, and for pressing a predetermined position on the glass plate on which the main cut line and the edge cut line have been formed, so as to bend-break the glass plate; and a bend-breaking head moving device for relatively moving the bend-breaking head device with respect to the glass plate supported by the supporting device, in correspondence with the edge cut line for bend-breaking to be formed as well as the predetermined position on the glass plate to be pressed.

In addition, in accordance with the present invention, the above objects are also attained by a glass-plate working apparatus comprising: a glass plate carrying-in section; a glass plate bend-breaking section disposed in proximity to the glass plate carrying-in section; a glass plate peripheral-edge grinding section disposed in proximity to the glass plate bend-breaking section; and a glass plate carrying-out section disposed in proximity to the glass plate peripheral-edge grinding section, wherein the glass plate bend-breaking section is provided with a supporting device for supporting a glass plate from the glass plate carrying-in section; at least one main cutter head device for forming a main cut line for bend-breaking on the glass plate supported by the supporting device; a main-cutter-head moving device for relatively moving the main cutter head device with respect to the glass plate supported by the supporting device, in correspondence with the main cut line for bend-breaking to be formed; at least one bend-breaking head device for forming an edge cut line for bend-breaking on the glass plate supported by the supporting device, and for pressing a predetermined position on the glass plate on which the main cut line and the edge cut line have been formed, so as to bend-break the glass plate; and a bend-breaking head moving device for relatively moving the bend-breaking head device with respect to the glass plate supported by the supporting device, in correspondence with the edge cut line for bend-breaking to be formed as well as the predetermined position on the glass plate to be pressed, and wherein the glass plate peripheral-edge grinding section is provided with a supporting device for supporting the glass plate from the glass plate bend-breading section; at least one grinding head device for grinding a bend-broken edge of the glass plate supported by the supporting device of the glass plate peripheral-edge grinding section; and a grinding-head moving device for relatively moving the grinding head device with respect to the glass plate supported by the supporting device of the glass plate peripheral-edge grinding section, in correspondence with the bend-broken edge of the glass plate to be ground.

In the present invention, the glass-plate working apparatus may further comprise: a transporting device for transporting the glass plate from the glass plate carrying-in section to the supporting device of the glass plate bend-breaking section, from the supporting device of the glass plate bend-breaking section to the supporting device of the glass plate peripheral-edge grinding section, and from the supporting device of the glass plate peripheral-edge grinding section to the glass plate carrying-out section, respectively.

In a preferred example, the supporting device of the glass plate bend-breaking section is provided with a belt conveyor having a flexible endless belt, a supporting member for supporting the flexible endless belt on a reverse side thereof, and a traveling device for traveling the endless belt. Meanwhile, the bend-breaking head device is provided with a cutter device for forming the edge cut line, as well as a press-breaking device for press-breaking the glass plate.

Furthermore, in the present invention, the glass-plate working apparatus may further comprise: a main-cutter-head rotating device for rotating the main cutter head device about an axis which is perpendicular to a plane of movement of the main cutter head device by the main-cutter-head moving device. Moreover, the glass-plate working apparatus may further comprise: a grinding-head rotating device for rotating the grinding head device about an axis which is perpendicular to a plane of movement of the grinding head device by the grinding-head moving device.

In the glass-plate working apparatus in accordance with the present invention, the unworked plate glass subject to bend-breaking is supported by being placed on the supporting device. Next, while the main cutter head device is being moved relative to the glass plate supported by the glass-plate supporting device by operating the main-cutter-head moving device, a main cut line for bend-breaking is formed on the glass plate supported by the supporting device by means of the main cutter head device. Then, in conjunction with or after the formation of the main cut line, while the bend-breaking-head moving device is being operated to relatively move the bend-breaking head device with respect to the glass plate supported by the glass-plate supporting device, an edge cut line is formed on the glass plate supported by the supporting device by means of the bend-breaking head device. At the same time, predetermined positions on the glass plate on which the main cut line and the edge cut line have been formed are pressed by the bend-breaking head device to bend-break the glass plate.

In accordance with the present invention, it is possible to provide a glass-plate working apparatus which is capable of overcoming the conventional problems, which is capable of fabricating glass plates of given configurations with high productivity, and which is capable of forming a main cut line and an edge cut line, as desired, and of working glass plates having aimed configurations with high accuracy.

Hereafter, a detailed description will be given of the present invention on the basis of preferred embodiments illustrated in the drawings. It should be noted that the present invention is not limited to these embodiments.

EMBODIMENTS

Figure 1:
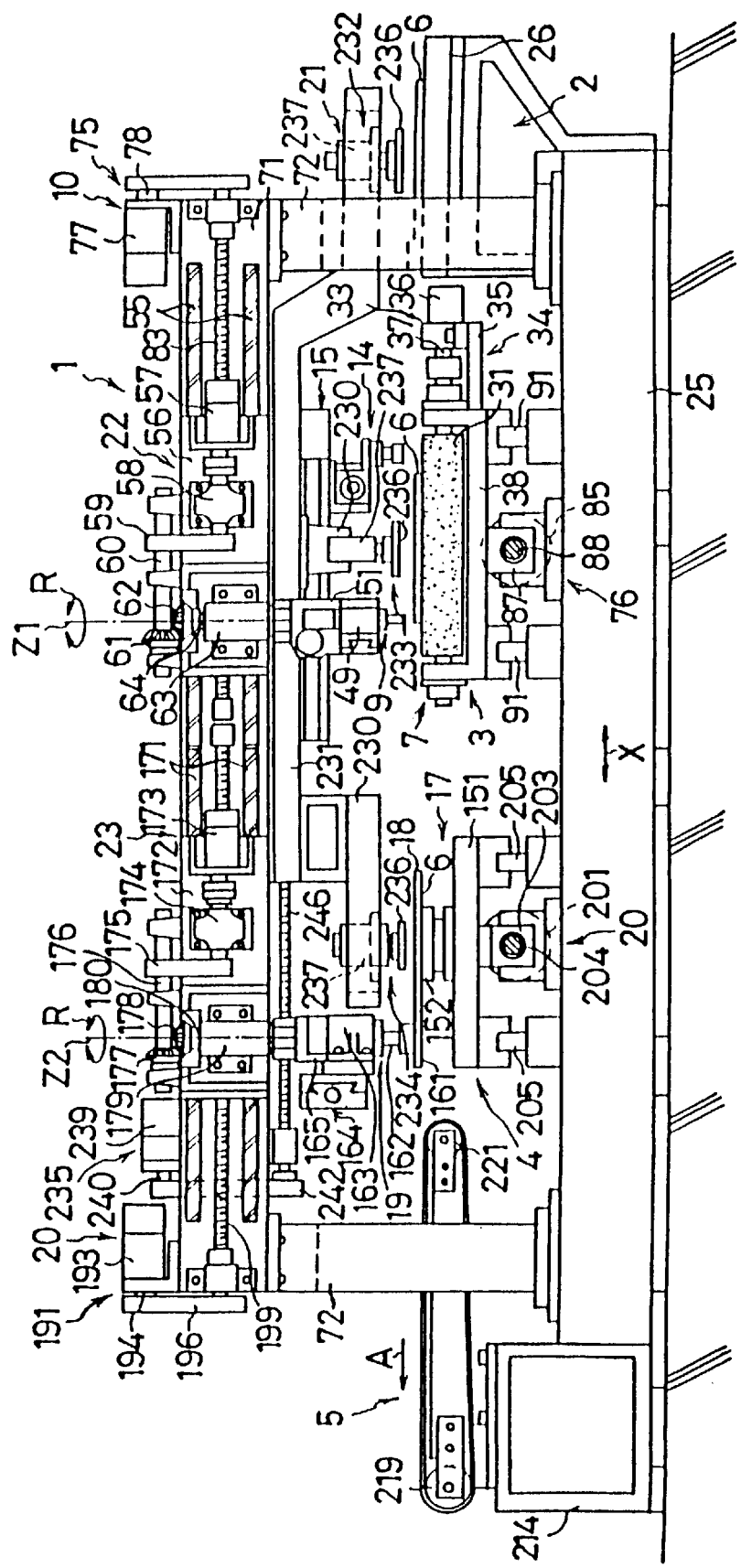
FIG. 1 is a front elevational view of a preferred embodiment of the present invention.
Figure 2:
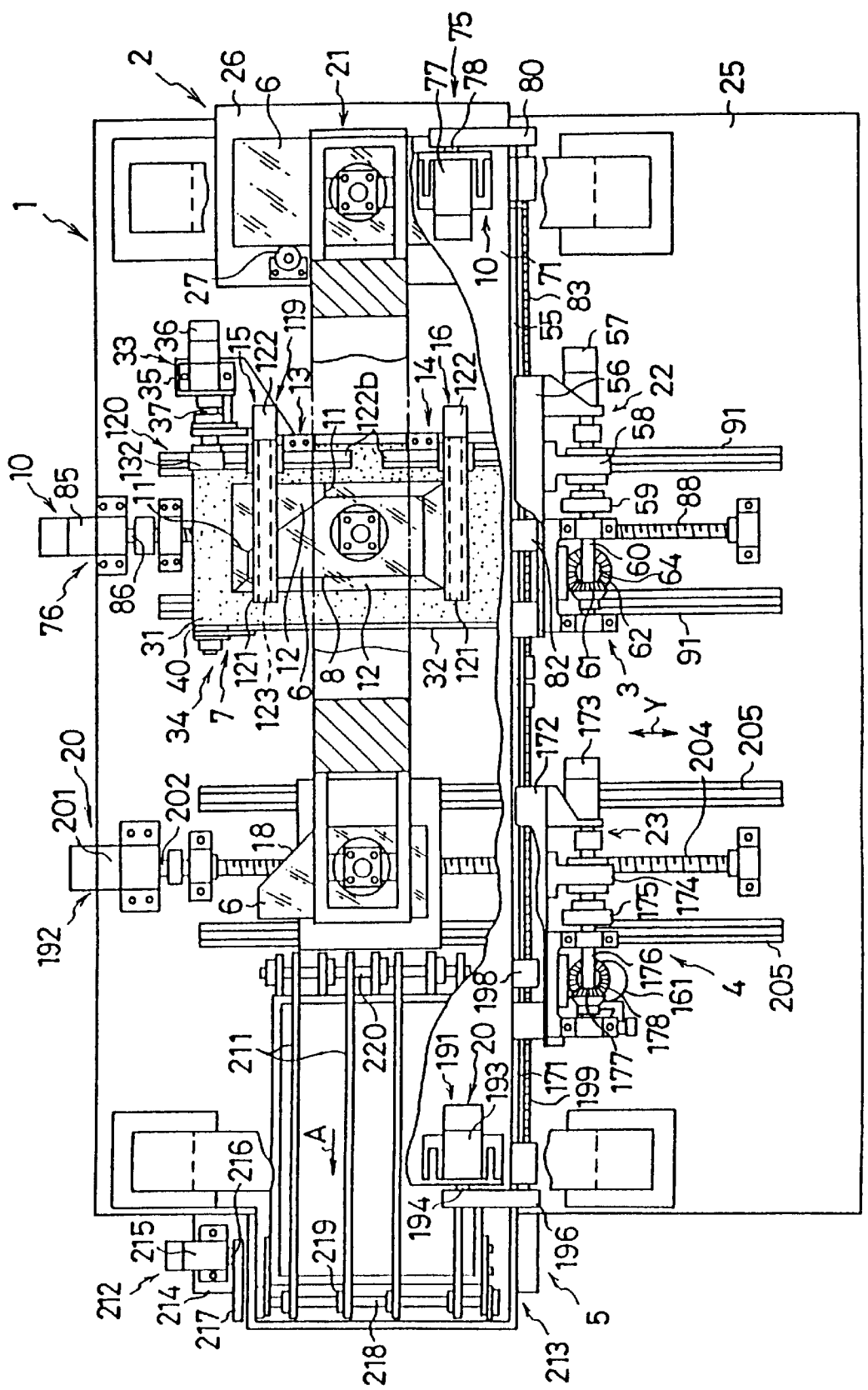
FIG. 2 is a partially cutaway plan view of the embodiment shown in FIG. 1.
Figure 3:
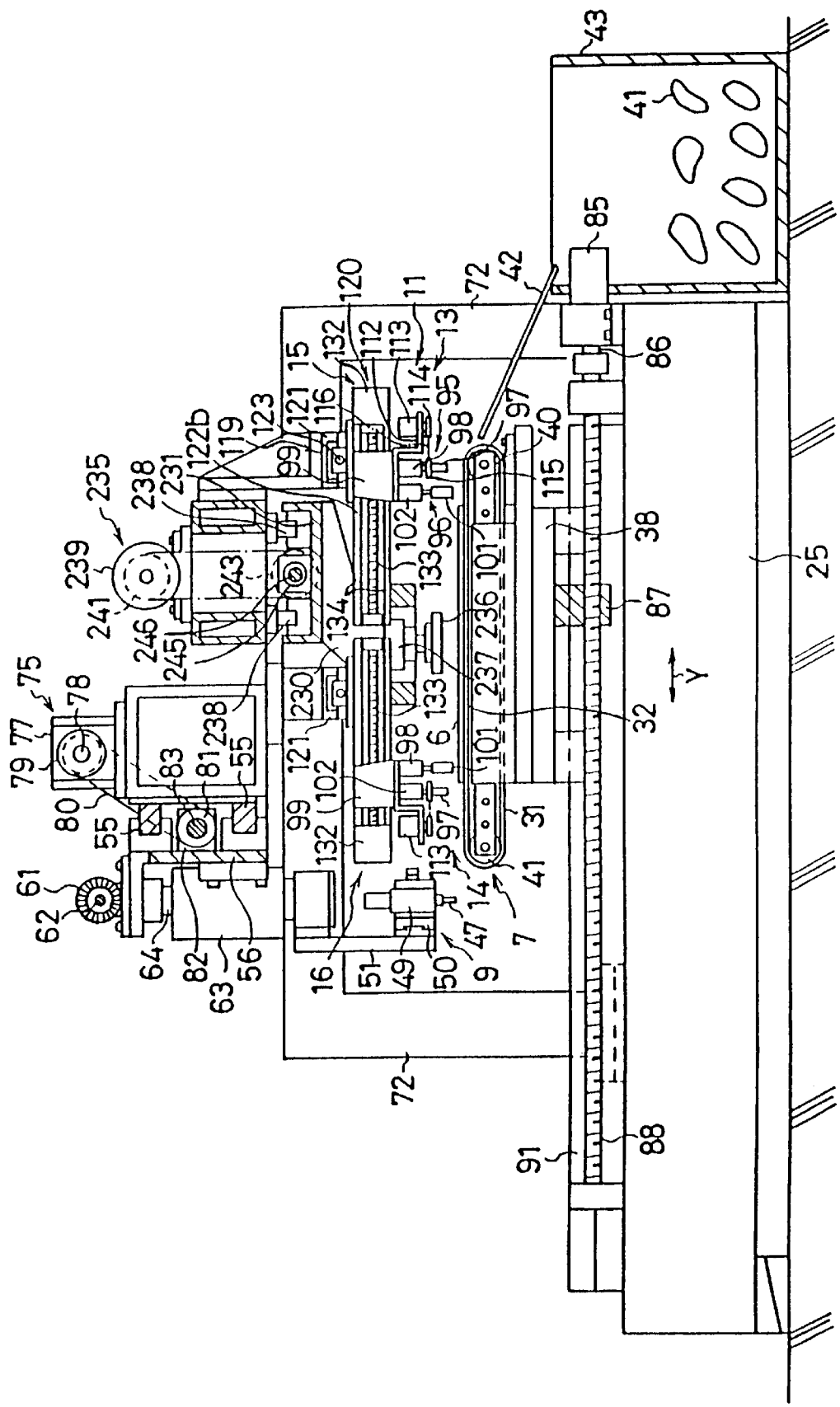
FIG. 3 is a partially cutaway side elevational view of the embodiment shown in FIG. 1.
Figure 4:
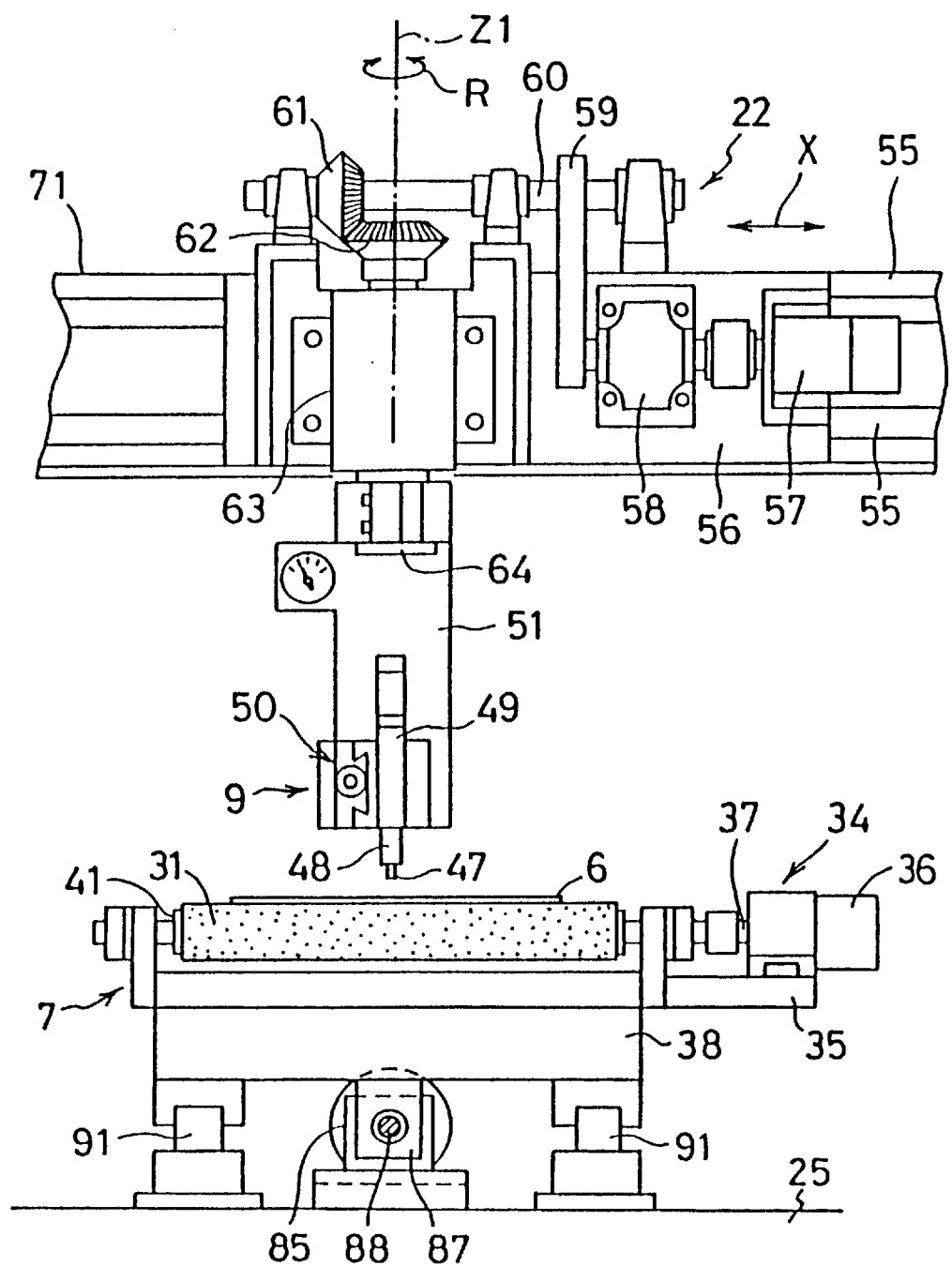
FIG. 4 is a partially detailed explanatory diagram of the embodiment shown in FIG. 1.

In FIGS. 1 to 4, a glass-plate working apparatus 1 in accordance with this embodiment comprises a glass plate carrying-in section 2, a glass plate bend-breaking section 3 disposed in proximity to the glass plate carrying-in section 2; a glass plate peripheral-edge grinding section 4 disposed in proximity to the glass plate bend-breaking section 3; and a glass plate carrying-out section 5 disposed in proximity to the glass plate peripheral-edge grinding section 4. The glass plate bend-breaking section 3 is provided with a supporting device 7 for supporting a glass plate 6 which is unworked plate glass from the glass plate carrying-in section 2; a main cutter head device 9 for forming a main cut line 8 for bend-breaking on the glass plate 6 supported by the supporting device 7; a main-cutter-head moving device 10 for relatively moving the main cutter head device 9 with respect to the glass plate 6 supported by the supporting device 7, in correspondence with the main cut line 8 for bend-breaking which is to be formed, a pair of bend-breaking head devices 13 and 14 for forming edge cut lines 11 for bend-breaking on the glass plate 6 supported by the supporting device 7, and for pressing predetermined positions 12, 12, . . . on the glass plate 6 on which the cut lines 8 and 11 have been formed, so as to bend-break the glass plate 6; and bend-breaking head moving devices 15 and 16 for relatively moving the bend-breaking head devices 13 and 14, respectively, with respect to the glass plate 6 supported by the supporting device 7, in correspondence with the edge cut lines 11 which are to be formed as well as the predetermined positions 12, 12, . . . on the glass plate 6 to be pressed. The glass plate peripheral-edge grinding section 4 is provided with a supporting device 17 for supporting the glass plate 6 from the glass plate bend-breading section 3; a grinding head device 19 for grinding a bend-broken edge 18 of the glass plate 6 supported by the supporting device 17; and a grinding-head moving device 20 for relatively moving the grinding head device 19 with respect to the glass plate 6 supported by the supporting device 17, in correspondence with the bend-broken edge 18 of the glass plate 6 to be ground.

The glass-plate working apparatus 1 is further provided with a transporting device 21 for transporting the glass plate 6, which is to be processed or has been processed, from the glass plate carrying-in section 2 to the supporting device 7, from the supporting device 7 to the supporting device 17, and from the supporting device 17 to the glass plate carrying-out section 5, respectively; a main-cutter-head rotating device 22 for rotating the main cutter head device 9 in an R direction about a ZI axis which is perpendicular to the plane of movement of the main cutter head device 9 by the main-cutter-head moving device 10, i.e., the X-Y plane in this example; and a grinding-head rotating device 23 for rotating the grinding head device 19 in the R direction about a Z2 axis which is perpendicular to the plane of movement of the grinding head device 19 by the grinding-head moving device 20, i.e., the X-Y plane in this example.

The glass plate carrying-in section 2 has, among others, a supporting base 26 attached to a base 25 as well as rollers 27 which are rotatably attached to the supporting base 26 so as to position the glass plate 6 which is placed on the supporting base 26.

The supporting device 7 is provided with a belt conveyor 34 having a flexible endless belt 31, a plate-like supporting member 32 for supporting the endless belt 31 on the reverse side thereof, and a traveling device 33 for traveling the endless belt 31. The traveling device 33 is provided with an electric motor 36 mounted on a frame 35, a driving drum 40 connected to an output rotating shaft 37 of the electric motor 36 and rotatably supported by a slider 38 supporting the frame 35, and a driven drum 41 rotatably supported by the slider 38. The endless belt 31 is trained between the driving drum 40 and the driven drum 41. In the supporting device 7 in which the glass plate 6 subject to bend-breaking is placed on the endless belt 31, in a state in which the slider 38 has been moved to an initial position after completion of one bend-breaking operation, if the endless belt 31 is made to travel by the rotation of the output rotating shaft 37 due to the operation of the electric motor 36, bend-broken scrap 41 (cullet) remaining on the endless belt 31 is discharged toward a chute 42 (not shown in FIG. 2) shown in FIG. 3. As a result, after the completion of one bend-breaking operation, the bend-broken scrap 41 slides on the chute 42, and is discharged into a bend-broken-scrap storing box 43.

The main cutter head device 9 is provided with a cutter wheel 47 and a pneumatic cylinder unit 49 having a piston rod 48 with the cutter wheel 47 attached to a distal end thereof. The pneumatic cylinder unit 49 is mounted on a bracket 51 by means of an adjusting mechanism 50 for adjusting the initial position of the cutter wheel 47 in the X-Y direction. When the pneumatic cylinder unit 49 of the main cutter head device 9 is actuated, and its piston rod 48 is hence extended, the cutter wheel 47 is pressed against the glass plate 6 placed on the endless belt 31, thereby forming the main cut line 8.

The main-cutter-head rotating device 22 is provided with a slider 56 fitted to a pair of guide rails 55, which extend in the X direction in parallel to each other, in such a manner as to be movable in the X direction; an electric motor 57 supported by the slider 56; a rotating shaft 60 rotatably supported by the slider 56 and connected to an output rotating shaft of the electric motor 57 via a reducing gear 58, and a pulley and a timing belt 59; a bevel gear 61 secured to the rotating shaft 60; and a Z-axis member 64 rotatably supported by the slider 56 by means of a bearing 63, a bevel gear 62 meshing with the bevel gear 61 being secured to an upper end of the Z-axis member 64, and the bracket 51 being secured to a lower end thereof. The pair of guide rails 55 are mounted on an upper frame 71 which is supported by the base 25 via a vertical frame 72. As for the main-cutter-head rotating device 22, as the electric motor 57 is operated, the rotating shaft 60 is rotated by means of its output rotating shaft, the reducing gear 58, and the pulley and the timing belt 59. As the rotating shaft 60 is thus rotated, the Z-axis member 64 is rotated about the Z1 axis in the R direction by means of the bevel gear 61 and the bevel gear 62. Then, the main cutter head device 9 mounted on the bracket 51 is rotated about the Z1 axis in the R direction. At the time of the formation of the main cut line 8, a blade of the cutter wheel 47 of the main cutter head device 9 is oriented in the direction in which the main cut line 8 is formed.

The main-cutter-head moving device 10 is provided with an X-direction moving unit 75 for moving the bend-breaking head devices 13 and 14 in the X direction as well as a Y-direction moving unit 76 for moving the glass plate 6 in the Y direction. The X-direction moving unit 75 has an electric motor 77 mounted on the upper frame 71 as well as a screw shaft 83 which is rotatably supported by the upper frame 71 and is threadedly engaged with nuts 82 secured to the slider 56, the rotation of an output shaft 78 of the electric motor 77 being transmitted to the screw shaft 83 by means of a pulley 79, a belt 80, and a pulley 81. As the electric motor 77 is operated, and its output shaft 78 is rotated, the screw shaft 83 is rotated by means of the pulley 79, the belt 80, and the pulley 81 so as to move the slider 56 in the X direction and to move the main cutter head device 9 mounted on the slider 56 by means of the Z-axis member 64 and the bracket 51 in the X direction. The Y-direction moving unit 76 has an electric motor 85 mounted on the base 25 as well as a screw shaft 88 which is connected to an output rotating shaft 86 of the electric motor 85 and is threadedly engaged with nuts 87 secured to the slider 38. The slider 38 to which the frame 35 is fixed is mounted movably in the Y direction on a pair of guide rails 91 extending in the Y direction in parallel to each other and disposed on the base 25. The screw shaft 88 is rotatably disposed on the base 25. As for the Y-direction moving unit 76, as the electric motor 85 is operated, and its output shaft 86 is rotated, the screw shaft 88 is rotated to move the slider 38 in the Y direction. As the slider 38 is thus moved in the Y direction, the main cutter head device 9 is relatively moved in the Y direction with respect to the glass plate 6 placed on the endless belt 31 supported by the slider 38.

Since the bend-breaking head device 13 and the bend-breaking head device 14 are formed in a similar manner, a description will be given hereafter of only the bend-breaking head device 13. Similar portions of the bend-breaking head device 14 will be denoted by corresponding reference numerals, and a description thereof will be given as required. The bend-breaking head device 13 is provided with a cutter device 95 for forming the edge cut line 11 as well as a press-breaking device 96 for press-breaking the glass plate 6. The cutter device 95 is provided with a cutter wheel 97 and a pneumatic cylinder unit 98 having a piston rod with the cutter wheel 97 attached to a distal end thereof. The pneumatic cylinder unit 98 is mounted on a slider 99. The press-breaking device 96 is provided with a pressing member 101 and a pneumatic cylinder unit 102 having a piston rod with the pressing member 101 attached to a distal end thereof, and the pneumatic cylinder unit 102 is mounted on the slider 99. As for the cutter device 95, the pneumatic cylinder unit 98 is operated, and its piston rod is hence extended, whereby the cutter wheel 97 is pressed against the glass plate 6 placed on the endless belt 31 so as to form the edge cut line 11. As for the press-breaking device 96, the pneumatic cylinder unit 102 is operated, and its piston rod is hence extended, whereby the pressing member 101 is pressed against the positions 12, 12, . . . on the glass plate 6 placed on the endless belt 31 so as to slightly strain the glass plate 6 and bend-breaking the glass plate 6 along the cut lines 8 and 11. The bend-breaking head device 13 in this example is further provided with a cutter wheel rotating device 111 for orienting the blade of the cutter wheel 97 in the cut-line forming direction. The cutter wheel rotating device 111 has an electric motor 113 mounted on the slider 99 by means of a bracket 112 as well as a belt 116 trained between a pulley 114 attached to an output rotating shaft of the electric motor 113 and a pulley 115 attached to the piston rod of the pneumatic cylinder unit 98. As for the cutter wheel rotating device 111, as the electric motor 113 is operated, and the piston rod of the pneumatic cylinder unit 98 is rotated by means of the pulley 114, the belt 116, and the pulley 115, which in turn causes the cutter wheel 97 to rotate about the vertical axis so as to orient its blade in the cut-line forming direction.

The bend-breaking head moving device 15 and the bend-breaking head moving device 16 relatively move the bend-breaking head device 13 and the bend-breaking head device 14, respectively, with respect to the glass plate 6 supported by the supporting device 7. Since the bend-breaking head moving device 15 and the bend-breaking head moving device 16 are formed in a similar manner, a description will be given hereafter of only the bend-breaking head moving device 15. Similar portions of the bend-breaking head moving device 16 will be denoted by corresponding reference numerals, and a description thereof will be given as required. The bend-breaking head moving device 15 is provided with an X-direction moving unit 119 for moving the bend-breaking head device 13 in the X direction and a Y-direction moving unit 120 for moving the bend-breaking head device 13 in the Y direction. The X-direction moving unit 119 is provided with a frame 121 extending in the X direction and mounted on the upper frame 71; an electric motor 122 mounted at one end of the frame 121; and a screw shaft 123 which is connected to an output rotating shaft of the electric motor 122 and is mounted rotatably on the frame 121 and which is threadedly engaged with nuts secured to a slide frame 122b. The slide frame 122b is fitted to a pair of guide rails (not shown) which extend in the X direction in parallel to each other, in such a manner as to be movable in the X direction. As for the X-direction moving unit 119, as the electric motor 122 is operated, and its output rotating shaft is hence rotated to rotate the screw shaft 123. Then, as the screw shaft 123 is rotated, the slide frame 122b is moved in the X direction, and the bend-breaking head device 13 is similarly moved in the X direction by means of the slider 99. The Y-direction moving unit 120 is provided with the slide frame 122b extending in the Y direction; an electric motor 132 mounted at one end of the slide frame 122b; and a screw shaft 133 which is connected to an output rotating shaft of the electric motor 132 and is mounted rotatably on the slide frame 122b and which is threadedly engaged with nuts secured to the slider 99. The slider 99 is fitted to a pair of guide rails 134 which extend in the Y direction in parallel to each other and are mounted on the slide frame 122b, in such a manner as to be movable in the Y direction. As for the Y-direction moving unit 120, as the electric motor 132 is operated, and its output rotating shaft is hence rotated to rotate the screw shaft 133. Then, as the screw shaft 133 is rotated, the slider 99 is moved in the Y direction, and the bend-breaking head device 13 is similarly moved in the Y direction by means of the slider 99.

The bend-breaking head devices 13 and 14 and the bend-breaking head moving devices 15 and 16 are allotted to predetermined areas of the glass plate 6 to effect the above-described operation of forming the edge cut lines 11 and the press-breaking operation.

The supporting device 17 has a slider 151 and a vacuum sucking unit 152 provided on the slider 151, and sucks, supports, and fixes the glass plate 6 from the glass plate bend-breaking section 3 by means of the vacuum sucking unit 152 during the grinding and polishing of its bend-broken edge 18.

The grinding head device 19 is provided with a grinding wheel 161 and an electric motor 163 having an output rotating shaft 162 to a lower end of which the grinding wheel 161 is secured. The electric motor 163 is mounted on a bracket 165 by means of an adjusting mechanism 164 for adjusting the initial position of the grinding wheel 161 in the X-Y-Z direction. As the grinding wheel 161 is rotated due to the operation of the electric motor 163, the grinding head device 19 grinds and polishes the bend-broken edge 18 of the glass plate 6.

The grinding-head rotating device 23 is provided with a slider 172 fitted to a pair of guide rails 101, which extend in the X direction in parallel to each other, in such a manner as to be movable in the X direction; an electric motor 173 supported by the slider 172; a rotating shaft 176 rotatably supported by the slider 172 and connected to an output rotating shaft of the electric motor 173 via a reducing gear 174 and a pulley and a timing belt 175; a bevel gear 177 secured to the rotating shaft 176; and a Z-axis member 180 rotatably supported by the slider 172 by means of a bearing 179, a bevel gear 178 meshing with the bevel gear 177 being secured to an upper end of the Z-axis member 180, and the bracket 165 being secured to a lower end thereof. The pair of guide rails 171 are mounted on the upper frame 71. As for the grinding-head rotating device 23, as the electric motor 173 is operated, the rotating shaft 176 is rotated by means of its output rotating shaft, the reducing gear 174, and the pulley and the timing belt 175. As the rotating shaft 176 is thus rotated, the Z-axis member 180 is rotated about the Z2 axis in the R direction by means of the bevel gear 177 and the bevel gear 178. Then, the grinding head device 19 mounted on the bracket 165 is rotated about the Z2 axis in the R direction. At the time of the grinding and polishing of the bend-broken edge 18, the grinding wheel 161 is oriented such that the center of rotation of the grinding wheel 161 is located above the normal line of the bend-broken edge 18 at the grinding and polishing position.

The grinding-head moving device 20 is provided with an X-direction moving unit 191 for moving the grinding head device 19 in the X-direction and a Y-direction moving unit 192 for moving the glass plate 6 in the Y-direction. The X-direction moving unit 191 has an electric motor 193 mounted on the upper frame 71 as well as a screw shaft 199 which is rotatably supported by the upper frame 71 and is threadedly engaged with nuts 198 secured to the slider 172, the rotation of an output rotating shaft 194 of the electric motor 193 being transmitted to the screw shaft 199 by means of a pulley and a belt 196. As the electric motor 193 is operated, and its output shaft 194 is rotated, the screw shaft 199 is rotated by means of the pulley and the belt 196 so as to move the slider 172 in the X direction and to move the grinding head device 19 mounted on the slider 172 by means of the Z-axis member 180 and the bracket 165 in the X direction. The Y-direction moving unit 192 has an electric motor 201 mounted on the base 25 as well as a screw shaft 204 which is connected to an output rotating shaft 202 of the electric motor 201 and is threadedly engaged with nuts 203 secured to the slider 151. The slider 151 is mounted movably in the Y direction on a pair of guide rails 205 extending in the Y direction in parallel to each other and disposed on the base 25. The screw shaft 204 is rotatably disposed on the base 25. As for the Y-direction moving unit 192, as the electric motor 201 is operated, and its output shaft 202 is rotated, the screw shaft 204 is rotated to move the slider 151 in the Y direction. As the slider 151 is thus moved in the Y direction, the bend-the grinding head device 19 is relatively moved in the Y direction with respect to the glass plate 6 placed on the vacuum sucking unit 152 supported by the slider 151.

The glass plate carrying-out section 5 is provided with a belt conveyor apparatus 213, which comprises a plurality of flexible endless narrow belts 211 disposed in parallel to each other and a traveling device 212 for causing the endless belts 211 to travel. The traveling device 212 is provided with an electric motor 215 mounted on a frame 214 on the side of the base 25; a plurality of drive rollers 219 connected to an output rotating shaft 216 of the electric motor 215 via a pulley and a belt 217 and the like and rotatably supported on a shaft 218 by means of the frame 214; and a plurality of driven rollers 221 rotatably supported on a shaft 220 by means of the frame 214. The endless narrow belts 211 are trained between the drive rollers 219 and the driven rollers 221. As for the glass plate carrying-out section 5, as the electric motor 215 is operated, and its output rotating shaft 216 is rotated, the belt 217 and the shaft 218 are rotated so as to move the endless narrow belts 211 in the A direction and to move the glass plate 6 placed on the endless narrow belts 211 from the glass plate peripheral-edge grinding section 4 in the A direction.

The transporting device 21 is provided with three lifting devices 232, 233, and 234 mounted on the slider 231 through a bracket 230 as well as a moving device 235 for moving the slider 231 in the X direction. Each of the lifting devices 232, 233, and 234 has a vacuum suction head 236 for sucking and holding the glass plate 6 under a vacuum and a pneumatic cylinder unit 237 having a piston rod in which the vacuum suction head 236 is attached to a distal end thereof, so as to raise and lower the vacuum suction head 236 when the pneumatic cylinder unit 237 is actuated. The slider 231 is fitted movably in the X direction to a pair of guide rails 238 extending in the X direction in parallel to each other and disposed on the underside of the upper frame 71. The moving device 235 has an electric motor 239 mounted on the upper frame 71 as well as a screw shaft 246 which is rotatably supported by the underside of the upper frame 71 and is threadedly engaged with nuts 245 secured to the slider 231, the rotation of an output shaft 240 of the electric motor 239 being transmitted to the screw shaft 246 by means of a pulley 241, a belt 242, and a pulley 243. As the electric motor 239 is operated, and its output shaft 240 is rotated, the screw shaft 246 is rotated by means of the pulley 241, the belt 242, and the pulley 243 so as to move the slider 231 in the X direction and to move the lifting devices 232, 233, and 234 mounted on the slider 231 by means of the bracket 230 in the X direction. As a result of the movement in the X direction of the lifting devices 232, 233, and 234 by the moving device 235 and the sucking, holding, and lifting of the glass plate 6 by the lifting devices 232, 233, and 234, the glass plate 6 supplied onto the supporting base 26 is transported onto the endless belt 31, the bend-broken glass plate 6 on the endless belt 31 is transported onto the vacuum sucking unit 152, and the glass plate 6 whose edge 18 on the vacuum sucking unit 152 has been ground and polished is transported onto the endless narrow belts 211. The placing onto the endless belt 31 of the glass plate 6 supplied onto the supporting base 26 is effected by the lifting device 232, the placing onto the vacuum sucking unit 152 of the bend-broken glass plate 6 on the endless belt 31 is effected by the lifting device 233, and the placing onto the endless narrow belts 211 of the glass plate 6 whose edge 18 on the vacuum sucking unit 152 has been ground and polished is effected by the lifting device 174.

It should be noted that the glass-plate working apparatus 1 is provided with a numerical controller in addition to the above-described devices. The numerical controller controls the above-described operation and the operation which will be described below, by a program which has been stored in advance.

The glass plate 6 is first positioned and placed on the supporting base 26 of the glass plate carrying-in section 2 by means of the rollers 27 and the like. As a result of the reciprocating motion in the X direction of the slider 231 of the transporting device 21, the glass plate 6 placed on the supporting base 26 is transported onto the endless belt 31, the bend-broken glass plate 6 on the endless belt 31 is transported onto the vacuum sucking unit 152, and the glass plate 6 whose edge 18 on the vacuum sucking unit 152 has been ground and polished is transported onto the endless narrow belts 211.

In the glass plate bend-breaking section 3, the main cutter head device 9 actuates the pneumatic cylinder unit 49 to press the cutter wheel 47 against the glass plate 6 placed on the endless belt 31. In the state in which the cutter wheel 47 is pressed against the glass plate 6, the main-cutter-head moving device 10 moves the main cutter head device 9 in the X direction by means of the X-direction moving unit 75, and moves the glass plate 6 placed on the endless belt 31 in the Y direction by means of the Y-direction moving unit 76. Consequently, the preprogrammed main cut line 8 is formed on the glass plate 6 placed on the endless belt 31 by means of the cutter wheel 47. During the formation of the cut line 8, the electric motor 57 is operated, so that the blade of the cutter wheel 47 is oriented in the direction in which the main cut line 8 is formed. After all the main cut line 8 is formed, and the main cutter head device 9 is moved to the initial position, the preprogrammed edge cut line 11 is formed on the glass plate 6 placed on the endless belt 31 by means of the cutter wheel 97 by the raising and lowering of the cutter wheel 97 due to the actuation of the pneumatic cylinder unit 98, and by the movement of the main cutter head device 13 in the X and Y directions due to the operation of the X-direction moving unit 119 and the Y-direction moving unit 120. After the formation of the edge cut line 11, the pressing member 101 is pressed against the preprogrammed positions 12, 12, . . . on the glass plate 6 placed on the endless belt 31 by the projection and retraction of the pressing member 101 due to the actuation of the pneumatic cylinder unit 102, and by the movement of the bend-breaking head device 13 in the X and Y directions due to the operation of the X-direction moving unit 119 and the Y-direction moving unit 120. Consequently, the glass plate 6 placed on the endless belt 31 is slightly strained, and is bend-broken along the cut lines 8 and 11. Incidentally, an arrangement may be provided such that after the formation of part of the main cut line 8, the edge cut line 11 which continues from the same is then formed, and this procedure is subsequently repeated, thereby forming the whole of the main cut line 8 and the edge cut line 11.

In the glass plate peripheral-edge grinding section 4, the vacuum sucking unit 152 sucks under a vacuum and fixes the glass plate 6 from the glass plate bend-breaking section 3, and the grinding head device 19 operates the electric motor 163 to rotate the grinding wheel 161. In the state in which the grinding wheel 161 is rotating, the grinding-head moving device 20 moves the grinding head device 19 in the X direction by means of the X-direction moving unit 191, and moves the glass plate 6 fixed on the vacuum sucking unit 152 in the Y direction by means of the Y-direction moving unit 192. Consequently, the bend-broken edge 18 of the glass plate 6 fixed on the vacuum sucking unit 152 is subjected to preprogrammed grinding and polishing by the grinding wheel 161. During the grinding and polishing operations, the grinding-head rotating device 23 is operated, and the grinding head device 19 is rotated such that such that the center of rotation of the grinding wheel 161 of the grinding head device 19 is located above the normal line of the bend-broken edge 18 at the grinding and polishing position.

After the completion of the operation of bend-breaking the glass plate 6 in the glass plate bend-breaking section 3 and the operation of grinding and polishing the bend-broken edge 18 in the glass plate peripheral-edge grinding section 4, the transporting device 21 is operated again, and the glass plate 6 subject to bend-breaking and the glass plate 6 subject to grinding and polishing are newly transported onto the endless belt 31 and the sucking unit 152, respectively. During the operation of the transporting device 21, as the endless belt 31 travels due to the operation of the electric motor 36, the bend-broken scrap 41 (cullet) remaining on the endless belt 31 is fed toward the chute 42, and slides on the chute 42 so as to be discharged into the bend-broken-scrap storing box 43.

In accordance with the glass-plate working apparatus 1 described above, since the formation of the main cut line 8 and the edge cut line 11 and the press-breaking can be carried out in the glass plate bend-breaking section 3, it is possible to produce glass plates of given configurations with high productivity. In addition, it is possible to reduce the problems associated with the transport of the glass plates can be reduced since the installation space can be made small, and the edge cut line 11 and the like can be formed accurately with respect to the main cut line 8.

The above-described glass-plate working apparatus 1 is arranged such that one glass plate at a time is transported onto the glass plate bend-breaking section 3 and the glass plate peripheral-edge grinding section 4, respectively, so as to effect the bend-breaking and peripheral edge grinding of the glass plate 6 with respect to one glass plate at a time, respectively. Alternatively, an arrangement may be provided as shown in FIGS. 5 and 6 in which the bend-breaking and peripheral edge grinding of the glass plate 6 are effected with respect to two or more glass plates at a time, respectively, (two glass plates, respectively, in the example shown in FIGS. 5 and 6).

Figure 5:
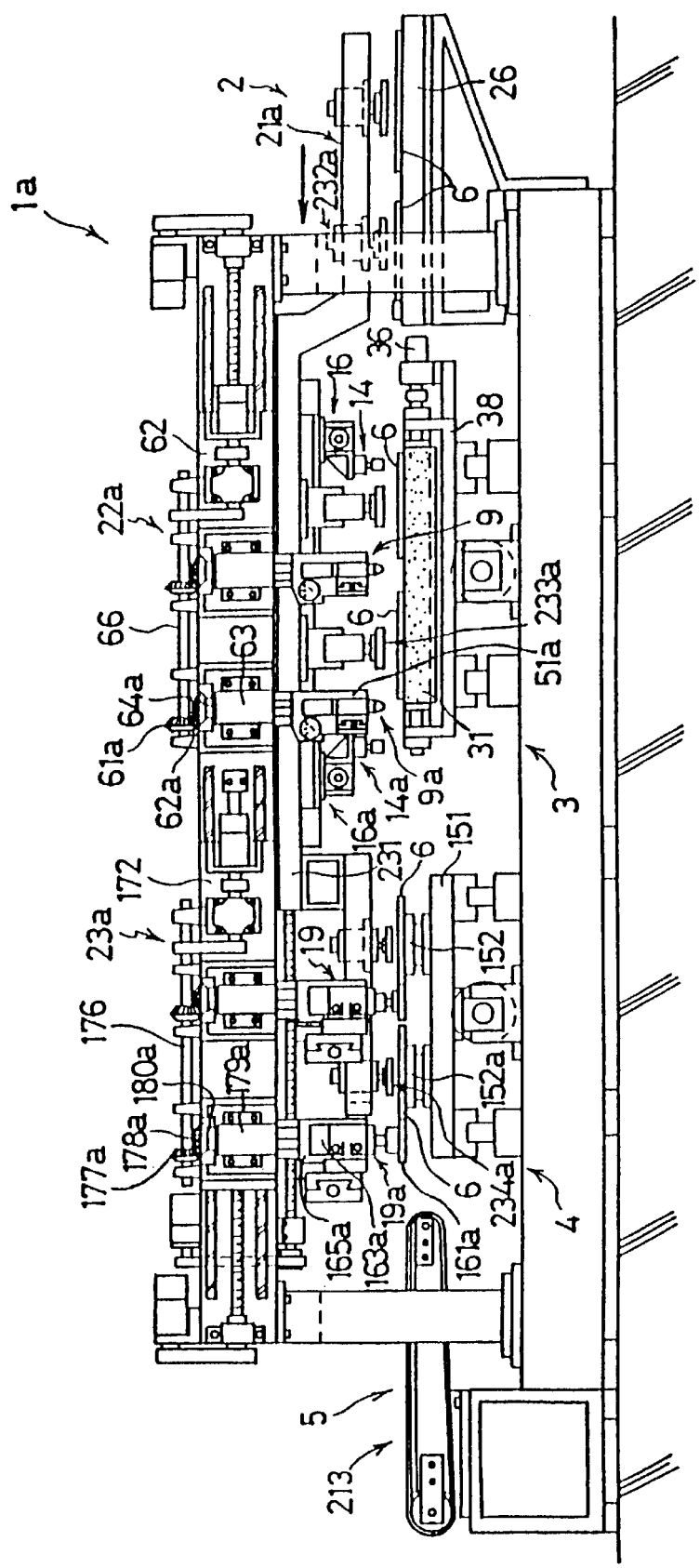
FIG. 5 is a front elevational view of another preferred embodiment of the present invention.
Figure 6:
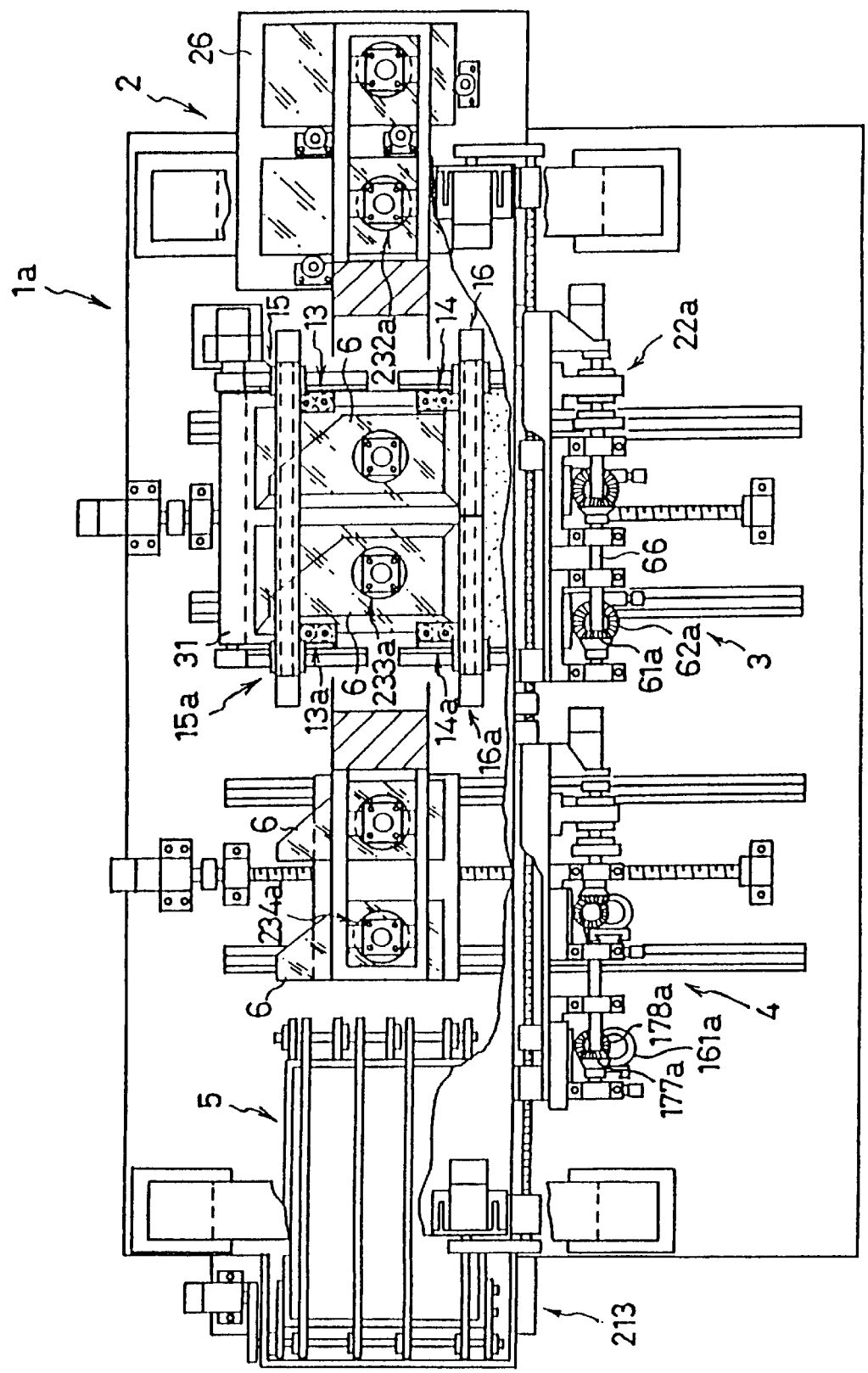
FIG. 6 is a partially cutaway plan view of the embodiment shown in FIG. 5.

That is, in a glass-plate working apparatus 1a in the example shown in FIGS. 5 and 6, the supporting base 26 of the glass plate carrying-in section 2 and the endless belt 31 of the glass plate bend-breaking section 3 are formed such that two glass plates 6 are simultaneously placed thereon, respectively. In addition to the main cutter head device 9, the two bend-breaking head devices 13 and 14, and the bend-breaking head moving devices 15 and 16, the glass plate bend-breaking section 3 is provided with a main cutter head device 9a, bend-breaking head devices 13a and 14a, and bend-breaking-head moving devices 15a and 16a which are respectively arranged in the same way as the main cutter head device 9, the bend-breaking head devices 13 and 14, and the bend-breaking head moving devices 15 and 16. In addition to the grinding head device 19 and the vacuum sucking unit 152, the glass plate peripheral-edge grinding section 4 is provided with a grinding head device 19a and a vacuum sucking unit 152a which are respectively arranged in the same way as the grinding head device 19 and the vacuum sucking unit 152.

The main cutter head device 9a is mounted on a bracket 51a. A main-cutter-head rotating device 22a in this example is provided with, in addition to the arrangement of the above-described main-cutter-head rotating device 22, a bevel gear 61a secured to the elongated rotating shaft 60 as well as a Z-shaft member 64a in which a bevel gear 62a meshing with the bevel gear 61a is secured to an upper end thereof and the bracket 51a is secured to a lower end thereof, the Z-axis member 64a being rotatably supported by the elongated slider 62 via a bearing 63a. The grinding head device 19a has a grinding wheel 161a and an electric motor 163a mounted on a bracket 165a. A grinding-head rotating device 23a in this example is provided with, in addition to the arrangement of the above-described grinding-head rotating device 23, a bevel gear 177a secured to the elongated rotating shaft 176 as well as a Z-shaft member 180a in which a bevel gear 178a meshing with the bevel gear 177a is secured to an upper end thereof and the bracket 165a is secured to a lower end thereof, the Z-axis member 180a being rotatably supported by the elongated slider 172 via a bearing 179a. The bracket 165a is attached to the Z-axis member 180a. The vacuum sucking unit 152a is arranged in the same way as the vacuum sucking unit 152, and is disposed on the slider 151. In addition, a transporting device 21a of the glass-plate working apparatus 1a is provided with, in addition to the arrangement of the transporting device 21, three additional lifting units 232a, 233a, and 234a respectively attached to the slider 231 by means of the bracket 230. These lifting units 232a, 233a, and 234a are arranged in the same way as the lifting units 232, 233, and 234.

The other arrangement of the glass-plate working apparatus 1a is provided in the same way as the glass-plate working apparatus 1. Accordingly, with the glass-plate working apparatus 1a, two glass plates 6 are synchronously subjected to bend-breaking and grinding in the glass plate bend-breaking section 3 and the glass plate peripheral-edge grinding section 4, respectively, in a similar manner, and are synchronously transported by the transporting device 21a.

In accordance with the glass-plate working apparatus 1a as well, it is possible to produce glass plates of given configurations with even higher productivity. In addition, the installation space can be made small, and the problems associated with the transport of the glass plates can be reduced.

I claim:

1. A glass-plate working apparatus comprising:

a glass plate carrying-in section;

a glass plate bend-breaking section disposed in proximity to said glass plate carrying-in section;

a glass plate peripheral-edge grinding section disposed in proximity to said glass plate bend-breaking section; and a glass plate carrying-out section disposed in proximity to the glass plate peripheral-edge grinding section, wherein said glass plate bend-breaking section is provided with a supporting device for supporting a glass plate from said glass plate carrying-in section; at least one main cutter head device for forming a main cut line for bend-breaking on the glass plate supported by said supporting device; a main-cutter-head moving device for relatively moving said main cutter head device with respect to the glass plate supported by said supporting device, in correspondence with the main cut line for bend-breaking to be formed; at least two bend-breaking head devices each for forming an edge cut line for bend-breaking on the glass plate supported by said supporting device, and for pressing a predetermined position on the glass plate on which the main cut line and the edge cut line have been formed, so as to bend-break the glass plate; and at least two bend-breaking head moving devices each for relatively moving said corresponding bend-breaking head device with respect to the glass plate supported by said supporting device, in correspondence with the edge cut line for bend-breaking to be formed as well as the predetermined position on the glass plate to be pressed, said bend-breaking head devices being disposed independent of said main cutter head device, said bend-breaking head moving devices being also disposed independent of said main-cutter-head moving device, and wherein said glass plate peripheral-edge grinding section is provided with a supporting device for supporting the glass plate from said glass plate bend-breaking section; at least one grinding head device for grinding a bend-broken edge of the glass plate supported by said supporting device of said glass plate peripheral-edge grinding section; and a grinding-head moving device for relatively moving said grinding head device with respect to the glass plate supported by said supporting device of said glass plate peripheral-edge grinding section, in correspondence with the bend-broken edge of the glass plate to be ground.

2. A glass-plate working apparatus according to claim 1, further comprising: a transporting device for transporting the glass plate from said glass plate carrying-in section to said supporting device of said glass plate bend-breaking section, from said supporting device of said glass plate bend-breaking section to said supporting device of said glass plate peripheral-edge grinding section, and from said supporting device of said glass plate peripheral-edge grinding section to said glass plate carrying-out section, respectively.

3. A glass-plate working apparatus according to claim 1 wherein said supporting device of said glass plate bend-breaking section is provided with a belt conveyor having a flexible endless belt, a supporting member for supporting said flexible endless belt on a reverse side thereof, and a traveling device for traveling said endless belt.

4. A glass-plate working apparatus according to claim 1 further comprising: a main-cutter-head rotating device for rotating said main cutter head device about an axis which is perpendicular to a plane of movement of said main cutter head device by said main-cutter-head moving device.

5. A glass-plate working apparatus according to any one of claims 1 to 4, wherein said bend-breaking head device is provided with a cutter device for forming the edge cut line, as well as a press-breaking device for press-breaking the glass plate.

6. A glass-plate working apparatus according to claim 1 further comprising: a grinding-head rotating device for rotating said grinding head device about an axis which is perpendicular to a plane of movement of said grinding head device by said grinding-head moving device.

7. A glass-plate working apparatus comprising:

a supporting device for supporting a glass plate;

at least one main cutter head device for forming a main cut line for bend-breaking on the glass plate supported by said supporting device;

a main-cutter-head moving device for relatively moving said main cutter head device with respect to the glass plate supported by said supporting device, in correspondence with the main cut line for bend-breaking to be formed;

at least two bend-breaking head devices each for forming an edge cut line for bend-breaking on the glass plate supported by said supporting device, and for pressing a predetermined position on the glass plate on which the main cut line and the edge cut line have been formed, so as to bend-break the glass plate; and at least two bend-breaking head moving devices each for relatively moving said corresponding bend-breaking head device with respect to the glass plate supported by said supporting device, in correspondence with the edge cut line for bend-breaking to be formed as well as the predetermined position on the glass plate to be pressed, said bend-breaking head devices being disposed independent of said main cutter head device, said bend-breaking head moving device being also disposed independent of said main-cutter-head moving device.

* * * * *

UNITED STATES PATENT AND TRADEMARK OFFICE
CERTIFICATE OF CORRECTION

PATENT NO. : 5,873,773
DATED : February 23, 1999
INVENTOR(S) : Shigeru Bando

It is certified that error appears in the above-identified patent and that said letters patent is hereby corrected as shown below:

Claim 5, line 1-2, change "any one of claims 1 to 4" to --claim 1--.

Signed and Sealed this

Thirty-first Day of August, 1999

Attest:

Q. TODD DICKINSON

*Attesting Officer*        *Acting Commissioner of Patents and Trademarks*